Figure 1:
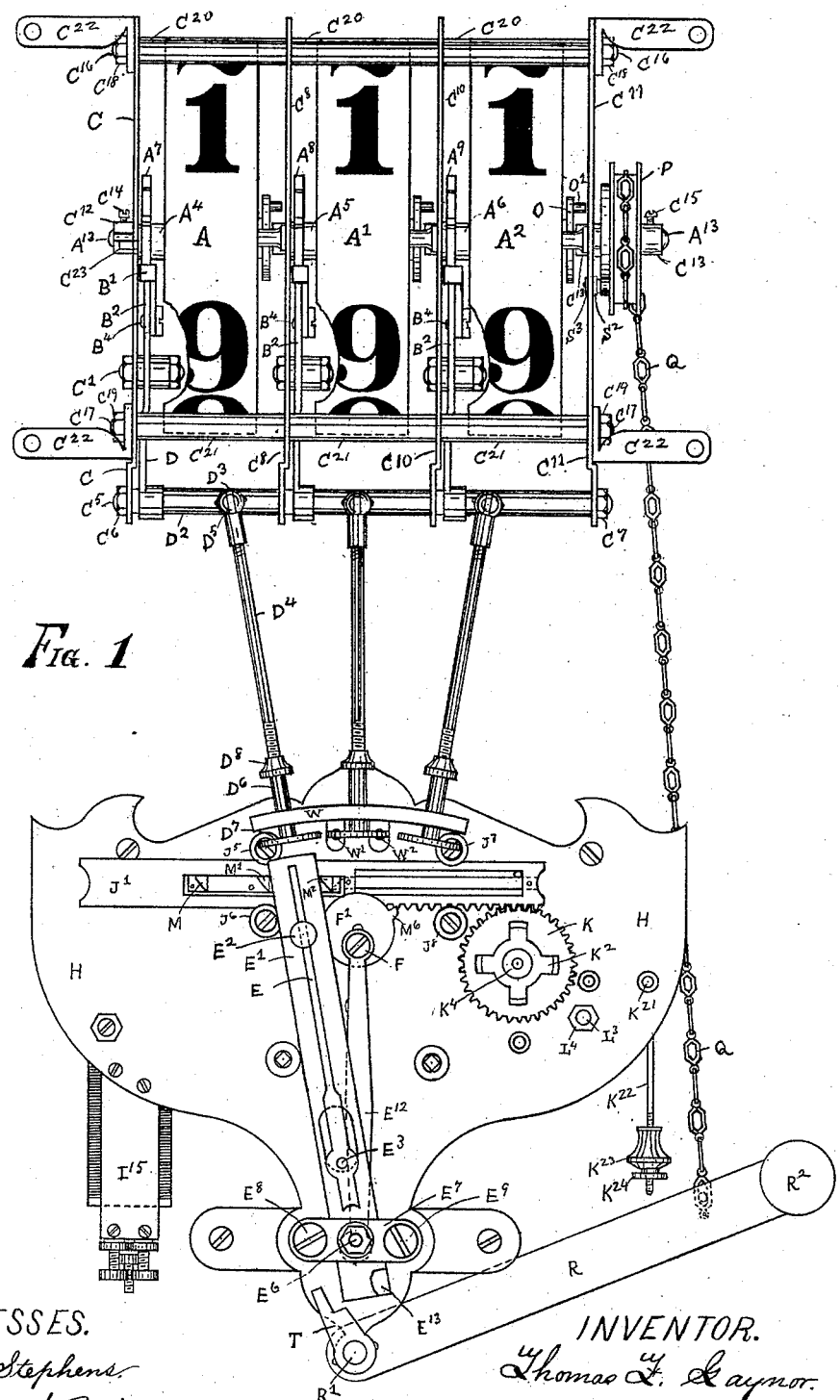

(No Model.)

T. F. GAYNOR.
ELECTRO MECHANICAL INDICATOR FOR FIRE ALARM TELEGRAPHS.

No. 445,991. Patented Feb. 10, 1891.

5 Sheets—Sheet 1.

WITNESSES.
E. H. Stephens
T. F. O'Brien

INVENTOR.
Thomas F. Gaynor (No Model.) 5 Sheets—Sheet 2.

T. F. GAYNOR.
ELECTRO MECHANICAL INDICATOR FOR FIRE ALARM TELEGRAPHS.

No. 445,991. Patented Feb. 10, 1891.

WITNESSES.
E. H. Stephens
T. F. O'Brien

INVENTOR.
Thomas F. Gaynor.

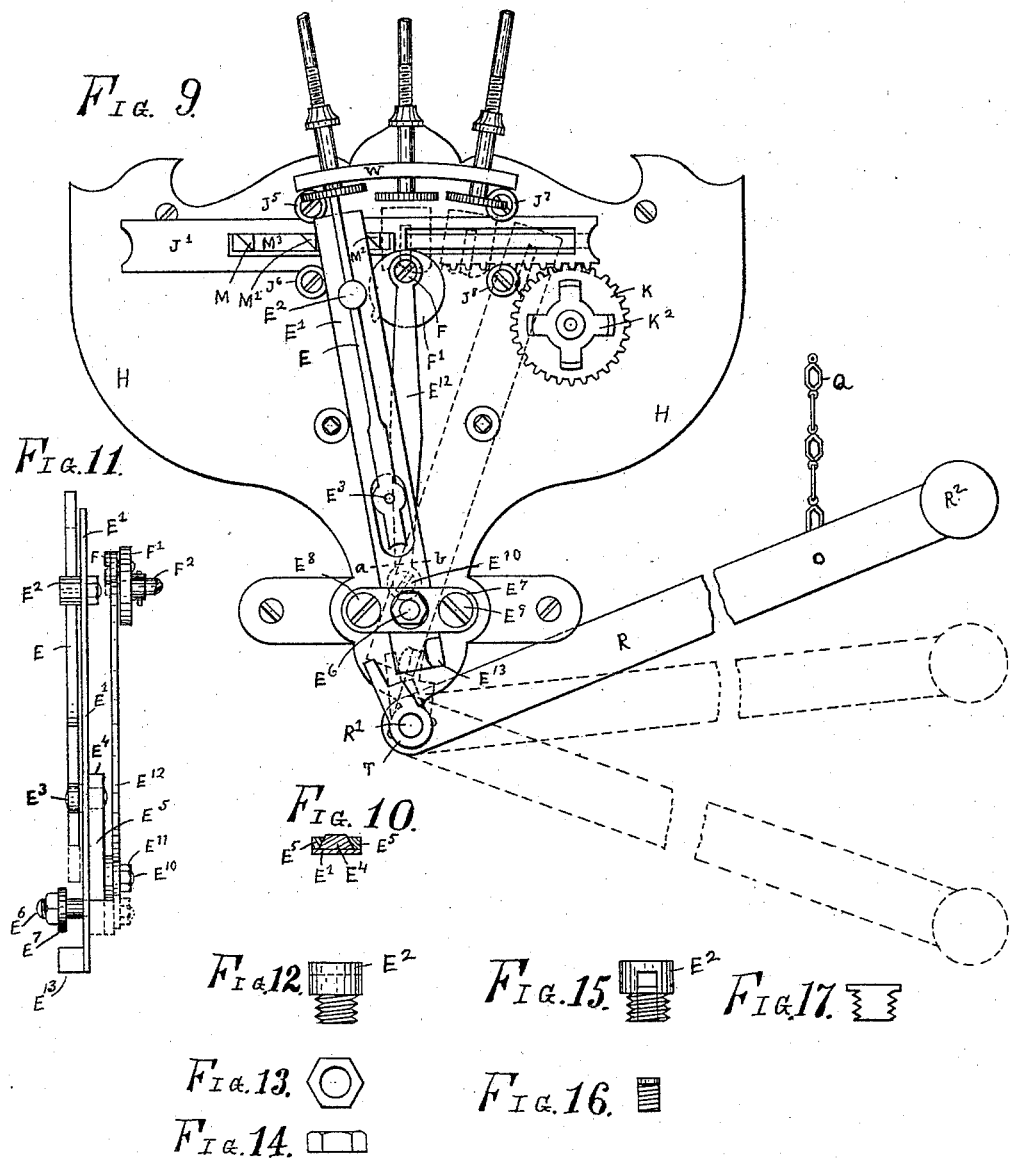

(No Model.) 5 Sheets—Sheet 4.
T. F. GAYNOR.
ELECTRO MECHANICAL INDICATOR FOR FIRE ALARM TELEGRAPHS.
No. 445,991. Patented Feb. 10, 1891.

WITNESSES.
T. F. O'Brien
M. V. Barlow

INVENTOR.
Thomas F. Gaynor (No Model.)  
T. F. GAYNOR.  
ELECTRO MECHANICAL INDICATOR FOR FIRE ALARM TELEGRAPHS.
No. 445,991. Patented Feb. 10, 1891.
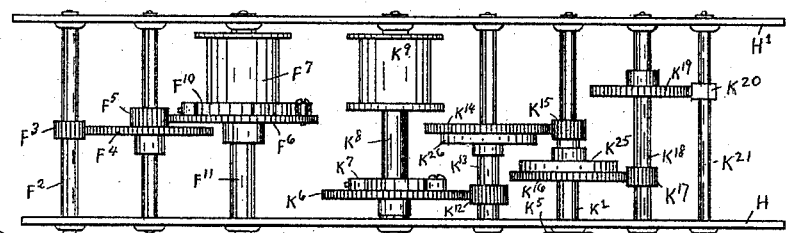
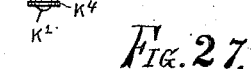
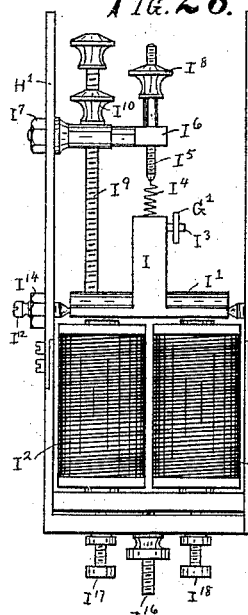
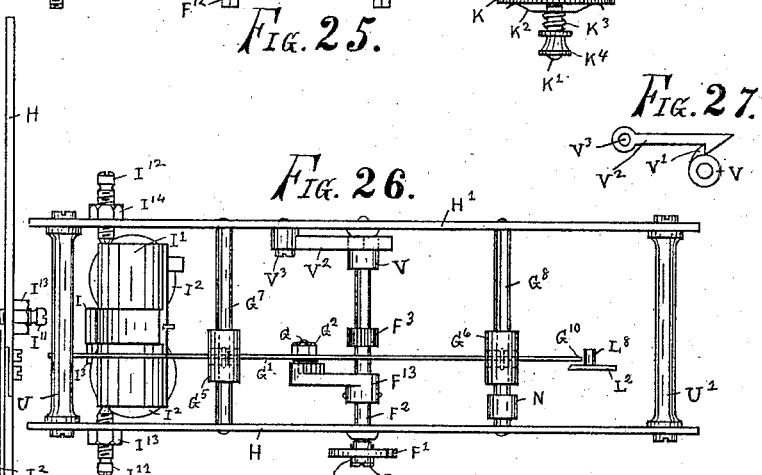
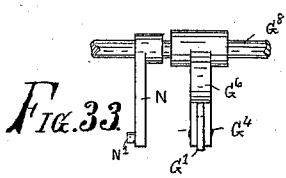
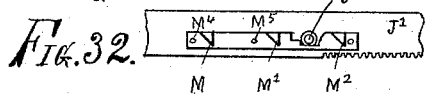
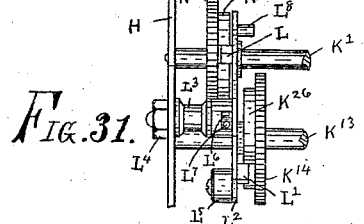
WITNESSES.  
E. W. Stephens  
T. T. O'Brien
INVENTOR.  
Thomas F. Gaynor

UNITED STATES PATENT OFFICE.

THOMAS F. GAYNOR, OF LOUISVILLE, KENTUCKY, ASSIGNOR TO THE GAYNOR ELECTRIC COMPANY, OF SAME PLACE.

ELECTRO-MECHANICAL INDICATOR FOR FIRE-ALARM TELEGRAPHS.

SPECIFICATION forming part of Letters Patent No. 445,991, dated February 10, 1891.

Application filed May 15, 1890. Serial No. 351,881. (No model.)

*To all whom it may concern:*

Be it known that I, THOMAS F. GAYNOR, a citizen of the United States, residing at Louisville, in the county of Jefferson and State of Kentucky, have invented certain new and useful Improvements in Electro-Mechanical Indicators for Fire - Alarm Telegraphs, of which the following is a specification.

My invention relates to that class of indicators in which a series of figured drums, through intermediate mechanism, are actuated by the movements of the armature of an electro-magnet responding to signals of an electric signal mechanism in such a manner as to cause said drums to rotate so as to present to view, through openings in a shield, the figures of the signal thus given. Indicators of this class usually consist of the following elements, namely: a series of drums having figures upon their peripheries and being arranged side by side upon a common axis, and also provided with springs or weights by which they are made to rotate about a complete revolution in one direction, and in being further provided with an escapement mechanism by which the rotation of said drums is regulated; a tripping device actuated by the movement of the armature of an electro-magnet, which causes a drum to rotate one figure forward, with each signal sent through the magnet; a time-train mechanism which is started into operation by the first impulse of the signal, which causes the tripping device to move from one drum mechanism to another, so as to indicate the number of the signal in plain figures of units, tens, hundreds, and so on, according to the Arabic notation; a restoring mechanism by which the tripping mechanism and drums are restored to their normal positions, so as to be ready for the next signal; a shield behind which the drums are placed and having apertures through which only the figures of the number of the signal can be seen, the whole mechanism being held together by a frame-work and being mounted in a suitable case.

Heretofore indicators have been made of small proportions, in order that the weight of the moving parts might not obstruct the operation and manipulation of the mechanism, and electric signals are usually slowly given that such machines may respond accurately. If it is desired to have the figures of liberal proportions in such devices, or if rapid signals are to be indicated, it will be found that the inertia of the moving parts will cause the mechanism to be unreliable for its purpose and sluggish in its manipulation. In indicators of this class the tripping device is usually moved forward from one drum mechanism to another by a carrier pivoted upon a time-train shaft having a frictional connection with said carrier. When a signal operates the tripping mechanism, the latter overpowers the said frictional connection and causes a temporary reversal of the motion of the carrier. Now it is necessary that this backward throw of the carrier be only just sufficient to bring it in line with the escapement mechanism of the proper drum to be acted upon, otherwise the time intervals of the signal will come irregularly, which will cause incorrect indications upon the drums. To such an extent does this objection prevail that the tripping mechanism of existing machines of this class will be found to be of the lightest and frailest construction possible consistent with operativeness.

Now the object of this invention is, first, to provide an indicator that can be made of large and substantial proportions; second, to provide an escapement mechanism that will admit of the rapid operation of the drums for the indication of rapid signals; third, to provide a restoring mechanism that will admit of rapid manipulation when the mechanism is to be restored to its normal position; fourth, to provide a frictional carrier mechanism that will admit of accurate and reliable adjustment, and to provide such other devices of improvement in this class of machines as will be hereinafter described.

As the casing and the shield, having apertures through which the figures on the drums can be seen, are of ordinary well-known construction and are not essential for the proper demonstration of this invention, they are omitted in the drawings.

The objects of this invention are attained by the mechanism illustrated in the accompanying drawings, in which—

Figure 2:
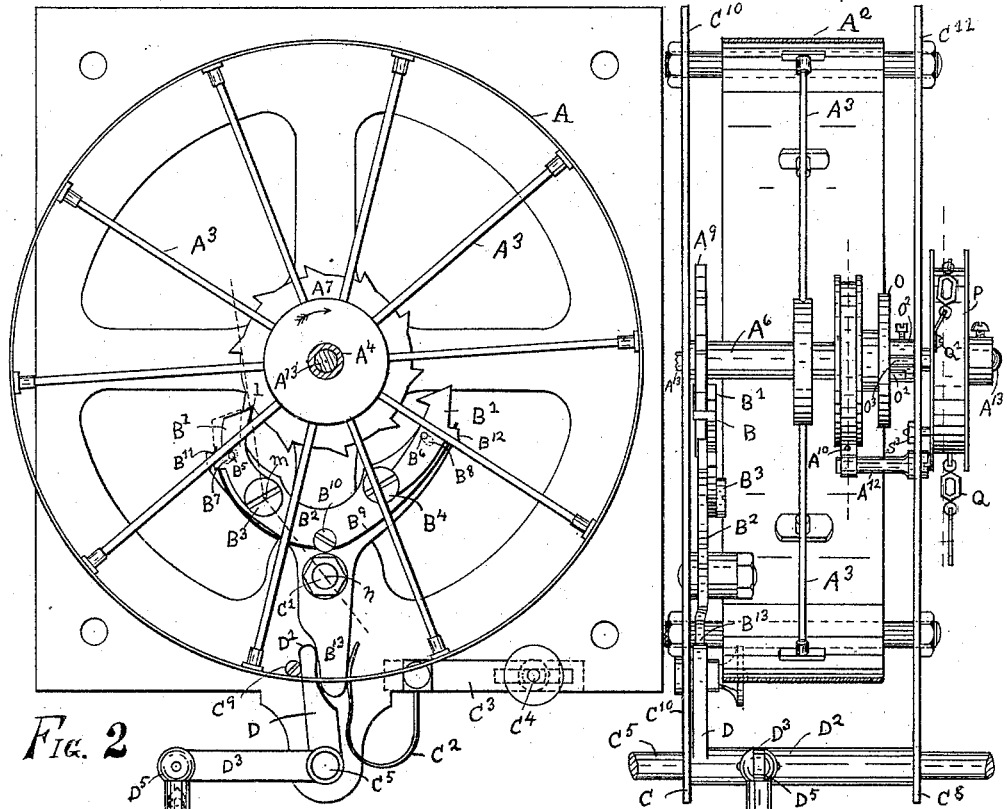
Figure 3:
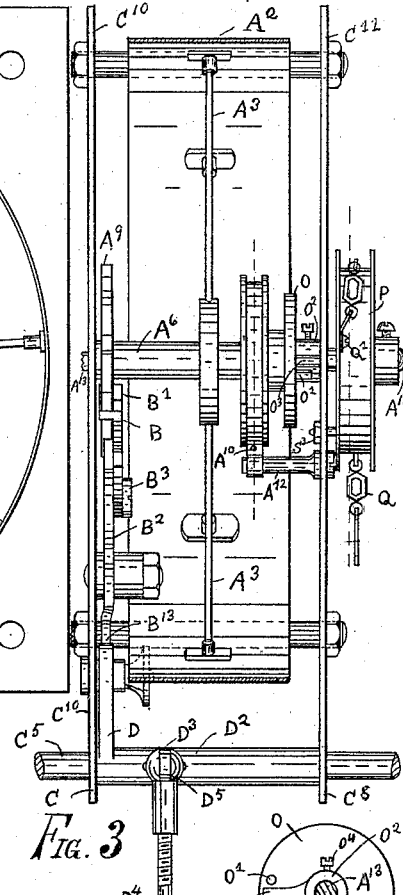
Figures 4, 5, 8:
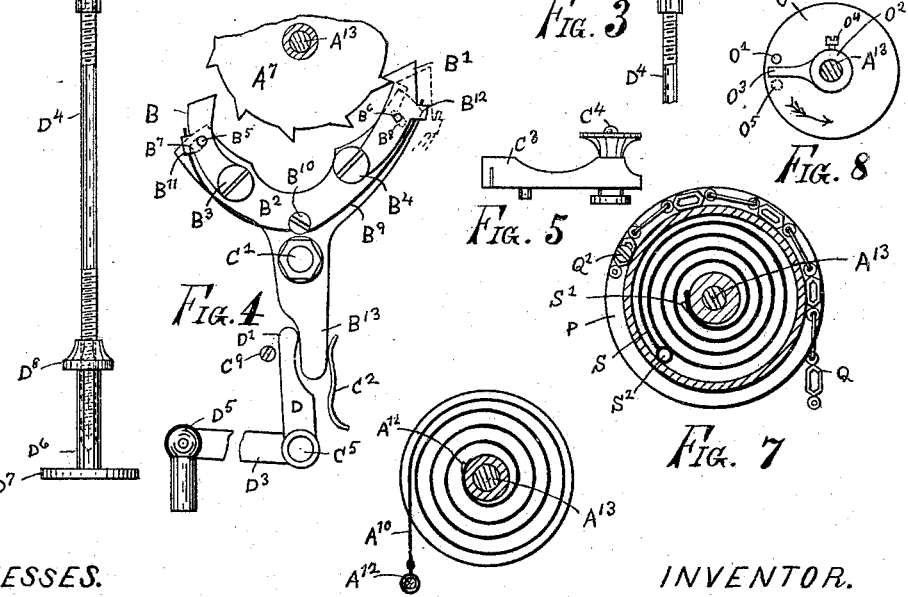
Figure 7:
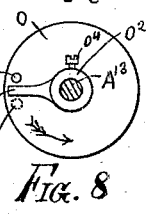
Figure 6:
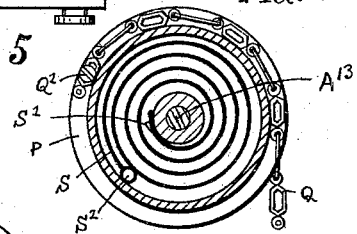
Figure 18:
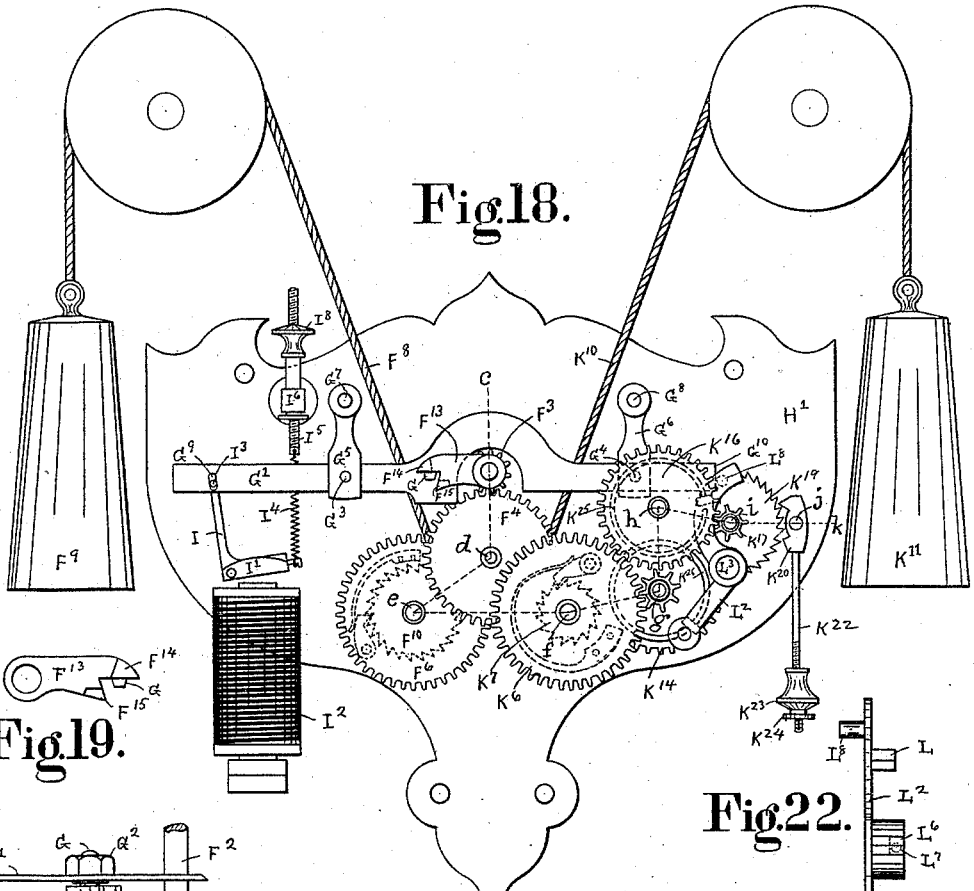
Figure 19:
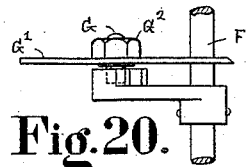
Figures 20, 21, 22:
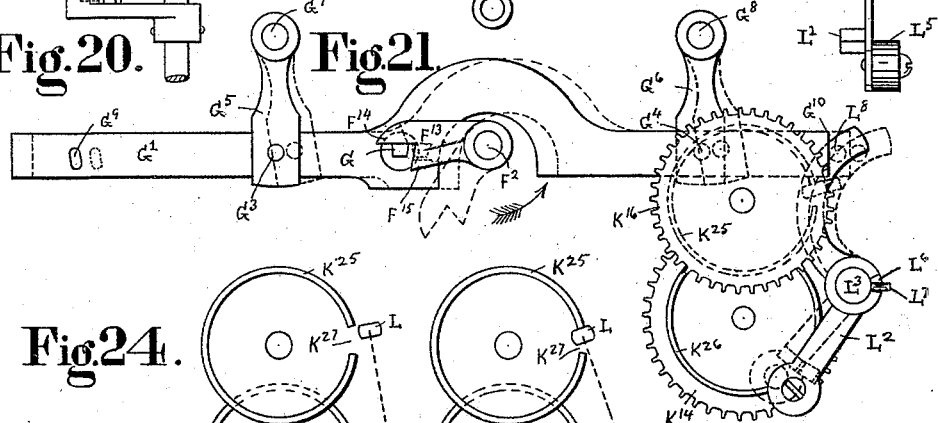
Figures 23, 24:
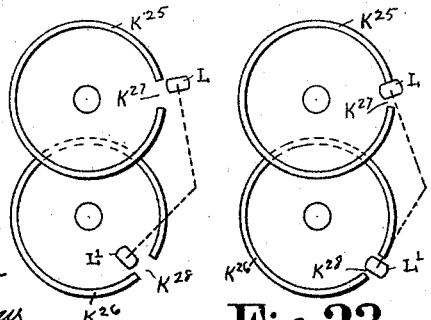

Figure 1 represents a front elevation of the invention. Fig. 2 represents a side elevation of the drum mechanism and escapement mechanism shown in Fig. 1, but of enlarged size for the purpose of clearness. Fig. 3 represents a side elevation of the drum mechanism, showing a part of the escapement mechanism and also part of the restoring mechanism, the drum being shown in vertical section for this purpose. Fig. 4 is a side elevation of the escapement mechanism, showing the independent movement of one of the pallets. Fig. 5 is a bottom view of the escapement-spring tension-slide. Fig. 6 shows a side view of one of the drum-propelling springs. Fig. 7 shows a side sectional view of the drum-restoring pulley mechanism. Fig. 8 shows a side elevation of the drum-restoring finger mechanism. Fig. 9 shows a front elevation of the tripping mechanism in the various positions which it assumes when the machine is in operation. It also shows a front view of the frictional connection of the tripping mechanism with the shaft of the time-train. It also shows the movement of part of the restoring device for restoring to their normal positions the drum mechanism and the tripping mechanism. Fig. 10 is a cross-section on the line $a\,b$ of the carrier in Fig. 9. Fig. 11 shows a side elevation of the tripping mechanism. Figs. 12, 13, 14, 15, 16, and 17 are detail views of the tripping-rod guide-block seen in Fig. 10. Fig. 18 shows a front elevation of the wheel-work and escapement mechanism of the tripping device. It also shows the wheel-work of the time-train, and it further shows the manner in which the armature of the electro-magnet trips the tripping mechanism and the time-train into operation. Fig. 19 shows a back view of the pallet-lever upon one of the shafts of the tripping device. Fig. 20 shows a top view of the pallet-lever in position resting upon the escapement-stud in the armature rock-bar. Fig. 21 shows the movement of the armature rock-bar when it liberates the pallet-lever of the tripping device and releases the time-train for operation, the whole being shown of enlarged size for the purpose of clearness. Fig. 22 is a side elevation of the time-train stop-lever seen in Fig. 21. Fig. 23 shows the position of the spurs of the stop-lever seen in Fig. 22 with relation to the stop-notches in concentric flanges which project laterally from the sides of two of the wheels of the time-train when the time-train is at rest and the machine is in its normal position. Fig. 24 shows the position which the spurs of the stop-lever assume with relation to the said stop-notches when the wheels of the time-train are released for action and while in motion. Fig. 25 represents a top view of the tripping mechanism, wheel-work, and the time-train mechanism on the line $c\,d\,e\,f\,g\,h\,i\,j$ in Fig. 18. Fig. 26 is a top view of the armature rock-bar mechanism seen in Fig. 18, showing its connection with the armature, the pallet-lever of the tripping mechanism, and the stop-lever of the time-train. Fig. 27 shows a front view of a pawl mechanism seen in Fig. 26, which is for the purpose of preventing a reversal of the mechanism during the act of winding up. Fig. 28 shows an end elevation of the electro-magnet and its armature mechanism. Fig. 29 shows a front view of the carrier-bar seen in Fig. 1, which connects the tripping mechanism with the friction-wheel of the time-train, being shown detached from the other mechanism for purposes of clearness. Fig. 30 is a top view of Fig. 29. Fig. 31 is a side view of the stop-lever and the flanged wheels of the time-train mechanism, which is also shown in Figs. 18, 21, 22, 23, and 24. Fig. 32 is a front view of the retracting mechanism, also seen in Figs. 1 and 9. Fig. 33 shows an end view of one of the pivot-shafts to which the tripping rock-bar is attached, and having a lock-lever which locks the movements of the rock-bar and the armature after a complete signal has been sent through the electro-magnet.

Similar letters refer to similar parts throughout the several views.

A A' A$^2$ represent figured drums, upon the peripheries of which index-figures are imprinted, which figures, together with the blank spaces corresponding to the zeros, are imprinted equidistant from each other around upon the outer surface of the drums. The drums A A' A$^2$ are connected by spokes A$^3$ A$^3$ A$^3$ to hubs A$^4$ A$^5$ A$^6$, (seen in Fig. 1,) one of which can be seen more fully in Fig. 3. One end of each hub is provided with an escape-wheel. (Seen at A$^7$ A$^8$ A$^9$.) Each of the escape-wheels is provided with a pair of pallets B B', which are pivoted to a pallet-lever B$^2$ by means of the pivot-screws B$^3$ B$^4$. Each of the pallets has a limited movement upon its respective pivot, and which is controlled by pins B$^5$ B$^6$, which are in the pallet-lever B$^2$ and which play in slots B$^7$ B$^8$, which are in the pallets. The pallets are pressed toward each other by the pallet-spring B$^9$, which is secured to the pallet-lever by the screw B$^{10}$. The ends of said spring are secured to the pallet by passing through holes which are drilled through the projections B$^{11}$ B$^{12}$ in the pallet.

The pallet-lever B$^2$ is pivoted to one of the drum frame-plates C upon the stud C'. The movement of the pallet-lever B$^2$ upon the stud C' is determined and controlled on one side by the action of a presser-spring C$^2$, which is secured to the plate C by the slide C$^3$ and which is provided with an adjustment thereon by means of the adjusting-screw C$^4$. The presser-spring C$^2$ presses the lower end B$^{13}$ of of the pallet-lever B$^2$ against the end D' of a tripping-lever D, which is loosely pivoted upon the shaft C$^5$, its movement being limited by the limiting-screw C$^9$, which is screwed into the plate C, which shaft extends through all the drum-plates, and is secured thereto by means of the nuts C$^6$ C$^7$.

The hub D$^2$ of the tripping-lever D is in the form of a long sleeve and fits between the frame-plates C C$^8$, thus preventing end motion. The hub $D^2$ of the tripping-lever D is provided with a horizontal extension $D^3$, to which the tripping-rod $D^4$ is connected in the form of a knuckle-joint $D^5$. The lower end of the tripping-rod $D^4$ is threaded and provided with a long nut $D^6$, having a broad head $D^7$ and a check-nut $D^8$, by means of which a length adjustment of the tripping-rod may be obtained. Each of the hubs $A^4$ $A^5$ $A^6$ is provided with a retracting-spring $A^{10}$, (seen in Figs. 3 and 6,) the inner end of which is connected to the hub by means of the pin $A^{11}$, its outer end being attached to the stud $A^{12}$, which is screwed to the drum-plate $C^8$. The purpose of this spring is to cause the drum to rotate forward and bring the teeth of the escape-wheel $A^7$ against the pallets B B' when the latter are oscillated with the pallet-lever $B^2$ by the action of the presser-spring $C^2$ or the tripping-lever D when the latter is actuated by the movement of the tripping-rod $D^4$.

The escapement mechanism, the tripping mechanism, and the retracting-spring mechanism of the drums A' $A^2$ are similar to that of the drum A, as already described, and need no further description. The escape-wheel and pallet mechanism already described is similar in construction and operation to the well-known anchor-escapement mechanism of clocks, and needs no further description, the only difference being in the loosely-pivoted construction of the pallets themselves, the purpose and advantage of which will be described hereinafter.

The hubs of all the drum mechanism are mounted upon the drum-shaft $A^{13}$, being loosely fitted thereon. The shaft $A^{13}$ passes through a hole in each of the drum-plates C $C^8$ $C^{10}$ $C^{11}$ and in which it has a bearing, its end motion being limited by the collars $C^{12}$ $C^{13}$, which are provided with set-screws $C^{14}$ $C^{15}$, by means of which they are secured to the shaft.

The drum-plates are all secured together by means of four bolts, two of which are seen at $C^{16}$ $C^{17}$, and which are provided with nuts $C^{18}$ $C^{19}$. The bolts are also provided with sleeves $C^{20}$ and $C^{21}$, which are loosely fitted upon said bolts and having a length equal to the distance between each two contiguous drum-plates. By this arrangement of parts the plates and the whole drum mechanisms are secured together in their proper relative position. The lugs $C^{22}$ $C^{22}$ are also secured to the plates by means of said bolts, and are for the purpose of attaching a shield which is omitted that the mechanism may be more clearly seen, and which is provided with apertures through which the proper figures are seen when the drum mechanism is operated, and which can be understood without further description.

E represents a push-rod adapted to have an end motion in line with the tripping-rods already described, and against the lower ends of which it is adapted to strike, and thereby allow motion through the pallet mechanism to the drums. It is secured near its upper end to a guide-bar E' by means of a guide-stud $E^2$, through which it slides, and the construction of which can be seen more clearly in Figs. 11, 12, 13, 14, 15, 16, and 17, where it is shown in detail. The lower end of the push-rod is connected by means of a stud $E^3$ to a slide $E^4$, having guides $E^5$ $E^5$, which are secured to the guide-bar E' by screws. (Not shown.) The lower end of the guide-bar E' is pivoted upon the stud $E^6$ to the stud-plate $E^7$, which is in front of the guide-bar and which is secured to the front movement-plate H by means of two posts having screws, the heads of which are seen at $E^8$ $E^9$. This arrangement of the pivot mechanism is for the purpose of supporting the lower end of the guide-bar mechanism in a stationary position, while allowing an unobstructed movement of the lower slide $E^4$ up and down over the end of the guide-stud $E^6$. The lower end of the slide $E^4$ is provided with a wrist-pin $E^{10}$, having a nut $E^{11}$, and is thereby adapted to be connected by means of the pitman $E^{12}$, which is fitted thereto with a crank-pin F, to which the pitman is also fitted, which is screwed into a crank F'. The crank F' is pinned upon the crank-shaft $F^2$, (see Fig. 26,) to which a rotary motion is given by a train of wheel-work consisting of the pinion $F^3$, the wheel $F^4$, the pinion $F^5$, the main wheel $F^6$, the drum $F^7$, upon which the cord $F^8$ is wound and to which the weight $F^9$ is attached.

The drum $F^7$ is provided with a ratchet-wheel mechanism $F^{10}$, and its arbor $F^{11}$ is squared at its outer end $F^{12}$, so that the weight-cord may be wound up on the drum by means of an ordinary clock-key fitted thereto.

A top view of the crank-shaft mechanism is shown in Fig. 26, and a view of its wheel-work on the line $c\ d\ e$, Fig. 18, is shown in Fig. 25. The magnet escapement-lever $F^{13}$ is fitted to the crank-shaft $F^2$, and is provided with feet $F^{14}$ $F^{15}$, which are adapted to engage with the detent-pin G, which is secured to the rock-bar G' by means of the nut $G^2$. The rock-bar G' is hung by means of pivots $G^3$ $G^4$ and hangers $G^5$ $G^6$ to the rock-shafts $G^7$ $G^8$, which are pivoted in the frame-plates H H'. By this manner of construction a short and nearly parallel end motion is given to the rock-bar by the vertical extension I of the armature I' whenever the armature vibrates in response to an electric impulse sent through the magnet $I^2$. The connection between the armature-extension I and the rock-bar G' consists of a pin $I^3$ $I^3$, which projects from said extension and plays in a small vertical slot $G^9$ in the end of the rock-bar and through which motion to the rock-bar is imparted. The armature I' is provided with a retracting-spring $I^4$, having adjustment by means of the adjusting-screw $I^5$, which is fitted in the post $I^6$, and which is secured to the back frame-plate H' by means of the nut $I^7$. The adjustment is given to the screw $I^5$ by means of the nut $I^8$. The upward movement of the armature I' is limited by the limiting-screw $I^9$, which is also fitted in the post $I^6$, and is provided with a check-nut $I^{10}$. The armature itself is pivoted to the plates H H' by means of the pivot-screws $I^{11}$ $I^{12}$, which are provided with check-nuts $I^{13}$ $I^{14}$.

The magnet $I^2$ is secured to the plates H H' by supports extending therefrom, one of which is shown at $I^{15}$, Fig. 1. A vertical adjustment of the magnet is obtained by means of the adjusting-screws $I^{16}$ $I^{17}$ $I^{18}$. It can be seen by the construction of the rock-bar mechanism already described that the vibrations of the armature will cause the detent G to change its position with reference to the feet $F^{14}$ $F^{15}$ of the lever $F^{13}$, so that with each complete double vibration of the armature the crank-shaft $F^2$ will make a complete revolution, and thereby through the pitman-connection with the push-rod E cause the latter to strike against the end of one of the tripping-rods, and thus through the escapement mechanism of the drum cause the drum to move forward one space, and thereby bring a figure into view, as the radial distance between each of the teeth of the escape-wheel and the centers of the figures is the same.

If the signal to be indicated on the drum mechanism could be represented by a unit figure one drum mechanism would be sufficient for the purpose. Fire-alarm signals, however, usually consist of two or more series of electrical impulses corresponding with numbers of two or more figures, as 23, 123, and the like, and as this device is specially intended for such service two or more drum mechanisms are necessary to make it complete. It is therefore necessary to provide a carrier mechanism which is operated by a time-train to move the push-rod from the first of the trip-rod mechanisms to the others successively, so that signals of two or more figures may be properly indicated. In giving a signal upon the receiving mechanism in a fire-alarm-telegraph system of, say, number 234, it is customary to so time the box mechanism as to cause the interval between the different series of strokes representing the number of the signal to be about two and a half times as long as the interval between each of the strokes of the series and also to make the interval between each of the rounds of the signals about two and a half times as long as the interval between each series of strokes. This difference in time between strokes, series of strokes, and rounds of signals constitutes the essential principle underlying the construction of all indicators of this class. It is therefore necessary to have the carrier mechanism of the push-rod and the time-train which actuates it very accurate in mechanical design and construction to make it reliable. This I have accomplished by the method of construction hereinafter shown and described.

J represents a carrier-pin, (see Figs. 29 and 30,) which is secured to the carrier-bar J' by means of the nut $J^2$. The upper end of the guide-bar E' is provided with carrier-guides $J^3$ $J^4$, between which the carrier J plays. The carrier-bar J' is fitted between two pairs of flanged friction-rollers $J^5$ $J^6$ $J^7$ $J^8$, which are loosely fitted upon screws, and thereby secured to the front plate H, thus holding the carrier-bar in place and allowing its free end motion. Part of the under edge of the carrier-bar has a rack cut thereon, which is adapted to engage with the friction-wheel K and upon which it also rests. The friction-wheel K is loosely fitted to the outer end of the friction-shaft K', and is secured thereon by means of the friction-spring $K^2$, the tension-spring $K^3$, and the tension-nut $K^4$, the latter being screwed upon the extreme outer end of the friction-shaft K', which is threaded to receive it. The flange $K^5$ upon the shaft K' takes the pressure of the friction-spring $K^2$, and the friction thus obtained enables the shaft J' to give a frictional rotary motion to the friction-wheel K, and thereby move the carrier-bar J' toward the right, thus bringing the push-rod from one trip-rod to another during the recording of the signal. The friction-shaft K' is propelled by a train of wheel-work consisting of the main wheel $K^6$, which is provided with a ratchet-wheel $K^7$, mounted upon the main shaft $K^8$, which is provided with a drum $K^9$, to which the cord $K^{10}$, having a weight $K^{11}$, is attached. The main wheel $K^6$ engages with the pinion $K^{12}$ upon the shaft $K^{13}$, which carries the wheel $K^{14}$, which in turn engages with the pinion $K^{15}$ upon the friction-shaft K'. As a means of regulating the movement of the friction-shaft K', it is provided with the train consisting of the wheel $K^{16}$, which is mounted thereon and which engages with the pinion $K^{17}$ of the shaft $K^{18}$, carrying the escape-wheel $K^{19}$, which engages with the pallet $K^{20}$, which is pivoted on the pivot-shaft $K^{21}$. The pallet $K^{20}$ has a threaded rod $K^{22}$ attached thereto, which is provided with a threaded pendulum-ball $K^{23}$ and a check-nut $K^{24}$ for the purpose of regulating the time of the whole movement. The object of this time movement, as already stated, is, through the carrier mechanism, to move the push-rod from its normal position, as seen in Figs. 1 and 9, toward the right, so as to bring it successively in alignment with the tripping-rods until it reaches the extreme position shown by the dotted lines in Fig. 9. It is necessary to provide a detent mechanism for the time-train to control its movement and keep the push-rod in its normal position and ready for the reception of a signal. It is also necessary to provide the detent mechanism with a starting device by which the vibrations of the armature in response to the signals actuating the magnet will set the carrier mechanism in motion. This I accomplish by the mechanism described as follows: The friction-shaft wheel $K^{16}$ and the second shaft-wheel $K^{14}$ are each provided with an annular flange $K^{25}$ $K^{26}$, a plan view of which may be seen in Figs. 23 and 24. These flanges are so arranged on the wheels that they face each other, as seen in Fig. 25, and are provided with notches $K^{27}$ $K^{28}$, adapted to receive lateral projections L L', extending from the side of a stop-lever $L^2$, which is pivoted upon the stud $L^3$, Fig. 31, which is secured to the front plate H by means of the nut $L^4$. The wheels $K^{14}$ and $K^{16}$ are geared to each other, so that the latter makes four revolutions to one of the former. This will cause the notches to assume the relative positions shown in Figs. 23 and 24 only at the end of every fourth revolution of the friction-shaft, and the time required to complete these four revolutions is always longer than that required in giving a single round of the longest signal in the system in which this machine is to be used.

The stop-lever $L^2$ is so placed with reference to the flanged wheels $K^{14}$ $K^{16}$ as to bring the projections L L' into the notches $K^{27}$ $K^{28}$, as shown in Fig. 23, which is the normal position of the flanged wheels when the mechanism is at rest and ready to indicate a signal. The lower end of the stop-lever $L^2$ is provided with a counter-balance $L^5$, which causes it to assume the position shown by the full lines in Figs. 18 and 21 and bring the stop projections into the position shown in Fig. 23.

The notch $L^6$ in the hub of the stop-lever $L^2$, and the pin $L^7$ within the notch and in the stud $L^3$ limits the movement of the stop-lever between the positions shown by the dotted lines and the full lines in Fig. 21. The upper end of the stop-lever $L^2$ is provided with a starting-pin $L^8$, Fig. 31, against which the end $G^{10}$ of the rock-bar G' engages, so that when the rock-bar is moved forward by the vibrations of the armature it moves the stop-lever from the position shown by the full lines, Fig. 21, to the position shown by the dotted lines. This causes the stop projections to change from the position shown in Fig. 23 to that shown in Fig. 24, thereby releasing the time-train and setting the carrier and push-rod mechanism into operation. After the flanged wheels are once thus liberated either one of the projections L L' will impinge against its corresponding flange, and thereby allow the friction-shaft mechanism to make the four revolutions necessary for the complete indication of the incoming signal. The signal having ceased giving its impulses upon the armature mechanism before the four revolutions of the friction-shaft have been completed, the rock-bar will assume the position shown by the full lines shown in Fig. 21, and thus allow the stop-lever to bring the stop projections into the notches again, as seen in Fig. 23, and thereby stop the friction-wheel mechanism from further movement and be ready for the reception of another signal. It can also be seen that the forward movement of the rock-bar will liberate the pallet mechanism of the crank-shaft $F^2$ and cause the latter to rotate a complete revolution with each complete movement of the rock-bar during its operation in response to each impulse of a signal, and thereby cause the push-rod to strike against one of the trip-rods, and thus register a number upon the drum. When the first impulse of a signal is sent through the magnet, it starts the carrier mechanism into operation, which carries the push-rod to the right, so that after two or more impulses would have been received the push-rod would be carried under the middle or even under the right-hand trip-rod, and thereby cause the first series of impulses to register upon two or three of the drums instead of on the single one, as it ought to. This necessitates providing a retracting mechanism so constructed that it will bring the push-rod back to the trip-rod controlling the drum that is registering the series of impulses after each impulse has been given, and at the same time allow the push-rod to reach the second and third trip-rod mechanism in time to similarly register upon the middle and right-hand drum if the signal consists of two more series of impulses. In other words, suppose it is necessary to indicate a signal from a fire-alarm box No. 345. Upon the first stroke of the 3 the carrier mechanism will immediately move toward the middle trip-rod and the successive strokes would be registered upon the middle and right-hand drums, if a retracting device were not provided to confine the first three strokes of the push-rod upon the left-hand trip-rod, the next four strokes upon the middle trip-rod, and the last five strokes upon the right-hand trip-rod, and thereby register the number 3, 4, and 5 upon the left-hand, middle, and right-hand drums, respectively, the signal would be so distributed upon the drums as to make it unintelligible. I therefore provide the carrier-bar J' with the teeth M M' $M^2$, which are formed upon the plate $M^3$, which is secured to it by rivets $M^4$ $M^5$. (See Fig. 32.) These carrier-teeth are so arranged with reference to the crank F' as to allow a retracting-tooth $M^6$, which is upon its periphery, to impinge against some one of them at all times during a signal in case the push-rod is carried beyond its proper position beneath the trip-rods and to bring it back to its correct alignment under the right trip-rod. On account of the peculiar form of design of this whole carrier-bar and trip-rod mechanism I am enabled to make the spaces between the teeth comparatively great and allow the carrier-bar a long movement. The advantage of all this is that if the interval between strokes, series of strokes, or rounds of a signal should vary a little or become irregular, unless such variations be very great this mechanism will properly indicate the signals notwithstanding, because of the wide range of movement of the parts and their liberal dimensions.

When the mechanism starts, the friction-wheel K carries the carrier-bar J', with the push-rod E, forward to the right; but when the push-rod is in a wrong position to properly strike a trip-rod for a subsequent impulse, then the retracting mechanism overcomes the frictional grip of the friction mechanism and allows the friction-wheel K, with the carrier-bar, to be reversed to bring the push-rod in proper position under a trip-rod, and this is done without stopping the movement of the time-train. Again, the friction mechanism is relatively so large and the lower part of the trip-rod mechanism being practically in a fixed position upon the stud $E^2$ that the inertia of the push-rod and carrier mechanism is fully controlled by the friction-wheel mechanism, so that in the reversal of the carrier-bar it is not thrown back by its inertia beyond the proper point under the trip-rod. When a complete round of a signal has been received and indicated upon the drums, it is necessary to prevent the subsequent rounds of the signal from interfering with the mechanism. Upon the completion of the four revolutions of the friction-shaft the stop-lever projections drop into the notches of the flanged wheels, as seen in Fig. 23, and as already described, which stops the friction-train from further movement; but the incoming impulses of the subsequent rounds of the signal (usually three or four) would start the stop-lever mechanism, the friction-train mechanism, and the crank-shaft mechanism, all of which would continue to work unnecessarily during such subsequent rounds, unless a suitable lock mechanism were provided to prevent this. Such mechanism I provide as follows: Secured to one of the rock-shafts $G^8$ is a lock-lever N, (see Figs. 26, 29, 30, and 33,) having a lock-pin N' projecting laterally from its lower end. This lock-lever oscillates back and forth with every vibration of the rock-bar and armature mechanism during the reception of a signal. An L-shaped tumbler $N^2$ is pivoted at one end to the front plate H by means of the screw $N^3$, while its upper end is provided with a pin $N^5$, which projects laterally therefrom and which is adapted to ride upon a rib $J^9$, which is secured in a horizontal position upon the inner side of the carrier-bar J'. One end $J^{10}$ of this rib $J^9$ is beveled off, as seen in Fig. 29. The lower edge of the tumbler $N^2$ is provided with a notch $N^6$, which is adapted to be in a registering position with reference to the lock-pin N' of the lock-lever N, so that when the carrier-bar is moved forward to its extreme position toward the right the beveled end $J^{10}$ of the rib $J^9$ allows the tumbler to drop down and cause the notch $N^6$ to engage with the lock-pin N' and thereby lock the lock-lever N, and thus prevent any further movement of the carrier-bar or armature mechanism. The beveled end $J^{10}$ of the rib $J^9$ is so located upon the carrier-bar J' with reference to the tumbler-pin $N^5$ as to come under the latter only when the carrier-bar reaches its extreme position to the right, (shown by the dotted lines in Fig. 9,) which can occur only after a complete round of signals shall have been received on the machine. The tumbler $N^2$ is loosely pivoted upon the screw $N^3$ and drops into position by its own weight. After a signal has been received upon the indicator and has been duly observed and it becomes necessary to restore all of the mechanism to its normal position again, so as to be ready for another signal, it necessitates the providing a restoring mechanism for this purpose. This restoring mechanism consists of the drum-restoring mechanism which is adapted to bring the drums back to their normal position, as seen in Fig. 1, so as to bring the blank spaces on the drums to the front. It also consists of the carrier-bar and push-rod restoring mechanism, which brings the carrier-bar and push-rod mechanism into their normal position, as shown in Fig. 1; and, finally, it consists in unlocking the lock-bar mechanism, so as to leave the armature mechanism free and leave the whole machine ready for operation by another signal, all of which I accomplish as follows:

Connected with each of the hubs of the drums is a wheel O, provided with a pin O'. A collar $O^2$, having a finger $O^3$, is secured to the drum-shaft $A^{13}$ by means of the set-screw $O^4$. The pin O' projects from the side of the wheel O in such a manner as to cause the finger $O^3$ to impinge against it and consequently carry the drum around with it whenever the shaft $A^{13}$ is rotated. In Fig. 8 the normal position of the pin O' is shown by the dotted lines at $O^5$ with reference to the finger $O^3$, while the full lines represent the position of the pin after the drum has run completely down so as to bring the figure 9 into view. The arrow represents the direction in which the wheel O rotates as the figures are successively brought into view, and when the shaft $A^{13}$, which carries the finger, is rotated in an opposite direction it carries the pin, with the drum mechanism, backward until the blank on the drum assumes its normal position in front again. Each of the three drums is provided with a similar restoring mechanism.

As a means of preventing the excessive rotation of the shaft $A^{13}$, the collar $C^{12}$ (see Fig. 1) is provided with a finger similar to that of the collar $O^2$, which is adapted to engage with a pin $C^{23}$, which is secured to the plate C and which arrests excessive motion of the finger and consequently of the shaft $A^{13}$ in either direction. When the shaft is rotated to the right, as indicated by the arrow in Fig. 2, the restoring wheel and finger mechanism already described carries with it any or all of the drums that may have been partly or wholly run down back again to their normal position. In this backward rotation the teeth of the escape-wheels strike against the back beveled surfaces of the pallets B B'; but by reason of the loosely-pivoted character of their construction they yield to the pressure of the teeth, as shown by the dotted lines in Figs. 2 and 4, and thus allow the escape-wheels to quickly assume their normal position without moving the pallet-lever mechanism $B^2$. The spring $B^9$ brings the pallets into their normal position after the drum mechanisms have been thus restored and the drums become held up in their normal position by the pallet B of each of the escapement mechanisms. With each double oscillation of the pallet-lever mechanism the drum mechanism moves forward one tooth of the escape-wheel, and thereby brings a new figure into view, as the number of the teeth in the escape-wheel and the number of the figures and the blank space on the drum are the same. As this device is intended to meet the requirements of quick signaling, it is necessary to prevent the rebound of the escape-wheel and drum mechanism when it is thrown forward against the pallets; otherwise a signal might cause the pallet mechanism to vibrate during the rebounding of the drum mechanism, and thus it would fail to register. This contingency is provided against, however, in the form of the loosely-pivoted pallet construction herein shown and described, as the momentum of the drum is cushioned upon the end of the pallet B by reason of the obliquity of the alignment of the end $l$ of the pallet, the center $m$ of the pallet-pivot $B^3$, and the center $n$ of the pallet lever-stud C', which arrangement causes the lower end of the pallet-lever $B^{13}$ to move slightly against the presser-spring $C^2$, which takes the concussion, and thereby allows the drum mechanism to come to rest at once, so as to be ready for another signal.

The drum mechanisms are thrown forward against the pallets by means of retracting-springs, one of which is shown connected to the hub of a drum in Fig. 6, and as already described. To restore the drums to their normal position, I provide the shaft $A^{13}$ with a pulley mechanism consisting of the grooved pulley P, which is secured to the shaft $A^{13}$ by means of a screw, and the chain Q, which is secured to one of the flanges of the pulley P by the screw Q', and which is wrapped around the pulley, the other end of the chain being secured to a pivoted hand-lever R, which is pivoted upon a shaft R', having bearings in the lower extremities of the movement-plates H H'. The hand-lever R is provided with a handle $R^2$, by which the restoring mechanism may be more readily manipulated. The movement of this hand-lever mechanism is shown more fully in Fig. 9. It is necessary, however, that the hand-lever mechanism, as well as the drum-shaft mechanism, shall be normally in the position shown in Figs. 1, 3, and 8; otherwise the pins of the restoring-wheels would be obstructed in their forward movement by their contact with the restoring-fingers of the shaft mechanism—that is, it is necessary to throw the fingers back into the position shown in Fig. 8, which is their normal position. The pulley P is therefore recessed upon its inner side, so as to receive the spring S, one end of which is secured to a pin S' in the hub, the other end being attached to a stud $S^2$, which is secured to the plate $C^{11}$ by means of the nut $S^3$, Figs. 3 and 7. The tension on this spring is strong enough to always throw the shaft into its normal position, as shown in Fig. 8, as well as lift up the hand-lever mechanism, as shown in Fig. 1. Consequently the drum-shaft mechanism is always in a position to allow the drums to throw the figures down to the highest numbers. When they are in this position, however, the pins in the restoring-wheels are in the position shown by the dotted lines in Fig. 8, when the fingers arrest their further movement, as already described. To restore the drum mechanisms to their normal position again, it is only necessary to draw the hand-lever down, as shown in Fig. 9, which through the chain and pulley mechanism already described causes the shaft, with all its finger mechanisms, to revolve in the direction shown by the arrow in Fig. 8 until its further motion is arrested by the finger of the collar $C^{12}$ upon the other end of the shaft $A^{13}$, Fig. 1. This carries the drums all back to their normal position, in which they are held by the pallet mechanism already described. The hand-lever may then be released, and the pulley-spring S will then throw the shaft $A^{13}$, with the finger mechanism thereon, back into its normal position, as shown in Fig. 8, and lift the hand-lever up, where it will be held until it is again similarly operated. The hand-lever shaft R' is provided with a carrier-bar-restoring lever T, which is secured thereon in such a position as to press against a lug $E^{13}$, projecting laterally from the lower end of the guide-bar E'. When the latter has assumed its extreme position to the right, as shown by the dotted lines in Fig. 9, so that when the hand-lever is drawn down to restore the drum mechanism to its normal position the guide-bar E' will at the same time be thrown back to the left, thereby carrying the carrier-bar also backward to its normal position and lifting up the tumbler $N^2$, so as to release the rock-bar and armature mechanism and putting the whole machine in its normal position ready to be actuated by another signal. When the carrier-bar is thus reversed, the frictional grip of the friction-spring $K^2$ upon the friction-wheel K is overcome without moving the friction-shaft mechanism in any way. The proper length of movement of the carrier-bar mechanism is regulated by stop-pins, which are secured to the front plate, but are not shown in the drawings. The device herein shown and described is adapted for an open circuit; but by a slight modification in the construction of the rock-bar mechanism, in which it would be made to accomplish in a reverse motion what it now does in its forward motion, the machine can be adapted for a closed circuit, as those skilled in the art can readily understand.

The movement-plates H H' are secured together by four posts, two of which are shown at U U', Fig. 26. The crank-shaft $F^2$ is provided near its back end with a collar V, Figs. 26 and 27, having a cam V' upon its periphery, against which the shoulder of a pawl $V^2$ engages. The pawl $V^2$ is pivoted to the back movement-plate H' by the screw $V^3$. The end of the pawl $V^2$ is beveled, so as to allow the crank-shaft to lift it up and move freely and rotate in one direction, while it prevents its rotation in an opposite direction. This pawl arrangement is for the purpose of preventing unnecessary movement of the crank-shaft when the main arbor $F^{11}$ is being wound up.

This entire mechanism is adapted to be mounted in a case which is not shown and in which the shield which covers the figures, as already referred to, is placed, and through the apertures of which the correct indications may be seen.

The operation of the device may be described as follows: The magnet is connected in an electric circuit through which the electric impulses corresponding to a signal are sent, the normal position of the mechanism being as seen in Figs. 1 and 18. The attraction of the armature (see Fig. 18) causes the rock-bar to be moved to the right, as shown by the dotted lines in Fig. 21. This movement releases the crank-shaft and detent mechanism and the crank-shaft revolves, causing the push-rod through the pitman mechanism to move upward, as seen in Fig. 9, and lift the left hand trip-rod, throwing the pallet-lever into the position as shown in Fig. 4, and thus through the escape-wheel allow the drum to move forward. As the crank-shaft completes its revolution the push-rod drops down into its normal position again, as shown in Fig. 1, which allows the pallet-lever and trip-rod mechanism to again assume its normal position, as shown in Fig. 2, and thus allow the drum to move forward one number. Every time an electrical impulse is sent through the magnet this operation is repeated upon some one of the drum mechanisms, according to the character of the number of the signal. At the time that the crank-shaft has been released by the rock-bar the stop-lever mechanism of the flanged wheels of the time-train are also released, as shown in Figs. 21 and 24, which causes the friction-wheel and carrier-bar mechanism to move the push-rod mechanism to the right, as shown in Fig. 9.

The time of the friction-wheel mechanism is so regulated as not to bring the push-rod beyond the range of the left-hand tripping-lever while the first series of impulses of the signal are being received, but to allow it to reach the middle and right-hand tripping-rods as a second and third series of impulses are received successively, during which the action of the push-rod is confined to the proper trip-rod mechanism. After the first round of impulses of the signal have been received the carrier-bar mechanism moves onward to the extreme right position shown in Fig. 9, after which the tumbler mechanism drops down and locks the rock-bar mechanism, so as to prevent its subsequent movement, as shown in Fig. 29. The friction-wheel mechanism moves on, however, until the notches in the flanged wheels assume the relative position shown in Fig. 23, when the stop projections of the stop-bar drop into the notches in the flanges, and thereby prevent the further movement of the time-train. When the tumbler mechanism (shown in Fig. 29) locks the rock-bar mechanism, the rock-bar is in its extreme left-hand position, as shown in Fig. 21, which brings the right-hand end of it away from the stop-lever pin, so as to allow the stop-lever projections to drop into the notches of the flanges of the wheels which it engages with. The machine, having properly indicated the signal, now becomes locked against further operation and will so remain, notwithstanding the subsequent rounds of the signal which may be going through the magnet until the restoring mechanism is actuated by means of the hand-lever and the whole machine restored to its normal condition in the manner already described. If the number of the signal consisted of only two series of impulses—as, for instance, coming from fire-alarm box No. 25—the signal would be registered upon the left-hand and middle drums, and the carrier mechanism would be moved over by the time-train to the extreme right, and the rock-bar mechanism thereby locked before the second round of the signal could come in. If the box-number consisted of a single series of numbers, like "8," for instance, it would be indicated upon the left-hand drum alone, and the carrier-bar mechanism would reach the extreme right position and thereby lock the mechanism, as already described. In this latter case, however, it would be necessary to have the interval between the series of strokes constituting the rounds of a longer duration than the time required for the carrier-bar mechanism to reach its extreme right position, which can be done by properly timing the box giving the signal.

The mechanism herein shown and described is adapted to indicate signals having numbers of three figures or less; but of course the capacity of the machine can be increased by the addition of more drum mechanism. By means of the nuts on the lower ends of the tripping-rods (seen in Fig. 1) the proper adjustment of their length may be obtained with reference to the push-rod beneath. The lower nuts of the trip-rods are elongated and of a cylindrical form, so as to fit holes in the guide W, which is secured to the front plate H by screws, the ends of which may be seen at W' and W². By this arrangement the lower ends of the trip-rods are kept in proper alignment with the push-rod.

Weights are shown in the drawings as furnishing the power to actuate the wheel mechanism. It can be understood, however, that springs can be substituted, if preferred.

Having thus described my invention, what I claim, and desire to secure by Letters Patent, is—

1. In combination with each one of a series of figured drums of an indicator, an escape-wheel, a pivoted pallet-lever having two loosely-pivoted pallets thereon adapted to engage with the escape-wheel, each having a slot in which a corresponding pin in the pallet-lever plays and by which their movement is controlled, and a spring secured to the pallet-lever, adapted to press the pallets toward each other against the escape-wheel, substantially as specified.

2. In combination with each one of a series of figured drums of an indicator, an escape-wheel, a pivoted pallet-lever having two pallets thereon, and a presser-spring secured to a frame-plate of the machine by a screw adjustment therewith and adapted to press upon the pallet-lever so as to bring one of the pallets against the escape-wheel, substantially as described.

3. In combination with the drum of an indicator, an escape-wheel connected therewith, a pivoted pallet-lever having two pallets thereon adapted to engage with the escape-wheel, a pivoted tripping-lever that actuates the pallet-lever, and a trip-rod having a knuckle-jointed connection with the tripping-lever, and also having a nut at its lower end, by means of which its length may be regulated with reference to a push-rod mechanism by which it is to be operated, substantially as specified.

4. In combination with the push-rod of an indicator, a guide-bar having guides for the push-rod and being pivoted at its lower end to the frame-plate of the machine, a pitman connected to the lower end of the push-rod, and a shaft in a train of wheel-work, provided with a crank connection with the pitman and through which motion is imparted to the push-rod whenever the shaft is rotated, substantially as specified.

5. In combination with the push-rod of an indicator, a guide-bar having guides for the push-rod and being pivoted at its lower end to a frame-plate of the machine, a carrier-bar mounted upon the frame-plate of the machine on friction-rollers and provided with a carrier-pin adapted to be loosely connected to the upper end of the guide-bar and having a rack upon its lower edge, a friction-wheel adapted to engage with the rack upon the carrier-bar, and a shaft of a time-train, having a frictional grip upon the friction wheel by means of a friction-spring secured thereon and adapted to move the push-rod mechanism, substantially as specified.

6. In combination with the push-rod of an indicator, a guide-bar having guides for the push-rod, a carrier-bar movable along its length, connected with the guide-bar and provided with teeth projecting therefrom, and a shaft of a train, provided with a retracting-tooth adapted to engage with the teeth upon the carrier-bar, so as in its rotation to bring the push-rod mechanism in a correct position under the tripping-rods of the indicator, substantially as specified.

7. In combination with the carrier-bar of an indicator having a rack thereon, a friction-wheel which is adapted to engage therewith, a shaft of a time-train, provided with a friction-spring and a nut adjustment, by means of which the shaft has a frictional grip upon the friction-wheel, two wheels in the time-train, each of which has a flange with a notch therein, and a pivoted stop-lever having stop projections that are adapted to play in and out of the notches of the flanged wheels, and thereby control the movement of the train and carrier-bar mechanism, substantially as specified.

8. In combination with the stop-lever mechanism of an indicator, a rock-bar suspended from pivoted links adapted to trip the stop-lever, and the armature of an electro-magnet connected with the rock-bar, so as to actuate the stop-lever mechanism whenever the armature is vibrated by an electro-magnet, substantially as specified.

9. In combination with the shaft of a push-rod mechanism of an indicator, an escape-lever provided with pallet-feet, a rock-bar laterally movable and provided with a detent adapted to engage with the escape-lever feet, and thereby to control the rotation of the shaft, and an armature connected with the rock-bar, by means of which the vibrations transmitted from an electro-magnet are made to allow the shaft to rotate and thereby actuate the push-rod mechanism, substantially as specified.

10. In combination with the carrier-bar of the push-rod mechanism of an indicator, a rib secured thereto, a pivoted tumbler having a pin projecting therefrom, and through which its movement is controlled by the rib upon the carrier-bar and being provided with a notch, and a lock-lever having a lock-pin adapted to engage with the notch in the tumbler and being connected through a rock-shaft with a rock-bar and armature mechanism and adapted to lock the same, substantially as specified.

11. In combination with the guide-bar of a push-rod mechanism of an indicator, a restoring-lever adapted to impinge against the end of the guide-bar, a shaft to which the restoring-lever is secured, and a hand-lever connected with the shaft, by which the push-rod mechanism may be restored to its normal position, substantially as specified.

THOMAS F. GAYNOR.

Witnesses:
T. F. O'BRIEN,
M. V. BARLOW.